United States Patent
Parliment et al.

[11] 3,767,425
[45] Oct. 23, 1973

[54] PROCESS FOR FLAVORING FOODSTUFFS WITH 2-ETHYL-3-METHOXYPYRAZINE AND PRODUCTS PRODUCED THEREBY

[75] Inventors: Thomas H. Parliment, Valley Cottage; Martin F. Epstein, Pearl River; William P. Clinton, Monsey, all of N.Y.; Richard Scarpellino, Ramsey, N.J.; Robert J. Soukup, New City, N.Y.

[73] Assignee: General Foods Corporation, White Plains, N.Y.

[22] Filed: Aug. 29, 1969

[21] Appl. No.: 854,306

[52] U.S. Cl. ................................ 99/65, 260/250 R
[51] Int. Cl. ........ A23f 1/00, A23l 1/26, C07d 51/76
[58] Field of Search .................... 99/140, 140 R, 65; 260/250 R

[56] References Cited
UNITED STATES PATENTS

| | | | |
|---|---|---|---|
| 3,328,402 | 6/1967 | Winter | 99/140 |
| 1,696,419 | 12/1928 | Staudinger | 99/65 |
| 3,630,750 | 12/1971 | Buttery et al. | 99/140 R |
| 3,702,253 | 11/1972 | Winter | 99/65 X |
| 3,711,482 | 1/1973 | Mookherjee | 99/140 R |

FOREIGN PATENTS OR APPLICATIONS

| | | |
|---|---|---|
| 1,156,475 | 6/1969 | Great Britain |
| 1,156,484 | 6/1969 | Great Britain |

Primary Examiner—Morris O. Wolk
Assistant Examiner—Sidney Marantz
Attorney—Thomas V. Sullivan, Bruno P. Struzzi and Daniel J. Donovan

[57] ABSTRACT

Enhancement of coffee flavored foodstuffs is achieved by the addition of a small but effective amount of one or more compounds corresponding to the general formula

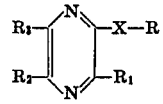

wherein X is oxygen or sulfur, R is a lower alkyl, preferably having one to three carbon atoms, and $R_1$, $R_2$ and $R_3$ are hydrogen or an alkyl of one to 12 carbon atoms provided that at least one of $R_1$, $R_2$ and $R_3$ is alkyl of two to 12 carbon atoms.

6 Claims, No Drawings

PROCESS FOR FLAVORING FOODSTUFFS WITH 2-ETHYL-3-METHOXYPYRAZINE AND PRODUCTS PRODUCED THEREBY

BACKGROUND OF THE INVENTION

1. Field of the Invention

The present invention relates to pyrazine derivatives and compositions which are useful as flavoring agents for modifying or improving the flavor and taste of foodstuffs, and more particularly to a group of chemical compounds which have been found to be useful in the area of flavor note alteration whether by the enhancement of flavor or flavor notes that are characteristic in a substance, by modification of a flavor or flavor note from a less to a more desirable one, or by the complete or partial masking of a flavor or flavor note. Still more particularly, the invention relates to pyrazine compounds which reduce the caramel flavor and impart a green, earthy, woody, regular coffee, flavor note to coffee flavored foodstuffs.

2. Description of the Prior Art

In the field of flavor enhancement, it has been general practice to employ synthetic and naturally isolated compounds and compositions to enhance and/or mask the flavor of foodstuffs. The enhancement of flavor is extremely complex, each individual flavor containing literally hundreds of cpomounds, each of which produces, to some degree, a flavor impact. In general, the isolation of a single flavor does not allow one to predict equivalent flavors since compounds of greatly differing structure have been found to produce approximately the same flavor character while compounds of similar structure frequently differ appreciably in taste. Consequently, the identification of desirable flavor components requires synthesis and trial of individual candidates until compounds are identified which have desirable flavor notes.

In the area of flavor enhancement of coffee and coffee flavored foodstuffs, thousands of compounds have been screened over the years in an attempt to isolate desirable components of coffee flavor. For many years, coffee technologists have searched for a flavor enhancing compound which would produce the flavor note generally described by experts as green and earthy and possibly low level of woody note.

SUMMARY OF THE INVENTION

The general purpose of this invention is to provide compounds and compositions which will enhance coffee flavored foodstuffs by imparting to them regular coffee flavor notes.

The flavor enhancement is achieved by the addition of a small, but effective amount of a compound of a formula

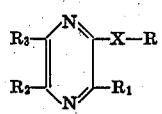

wherein X represents a member selected from the group consisting of oxygen and sulfur; R is a lower alkyl, preferably having one to three carbon atoms; $R_1$, $R_2$ and $R_3$ represent a member selected from the group consisting of hydrogen and alkyl of one to 12 carbons provided that at least one of $R_1$, $R_2$ and $R_3$ is an alkyl of two to 12 carbon atoms, preferably three to five carbon atoms.

The above pyrazine compounds of formula I enhance coffee flavor by masking the typical caramel flavor, and by imparting regular coffee flavor notes, generally described by experts as green, earthy, low level woody when incorporated in minute amounts in foodstuffs.

There is an increase in the desirable earthy, green, woody and green pepper notes and an improved mouthfeel. The compounds of formula I also mask the undesirable resinous, grainy, and paper character of soluble coffee. The pyrazines of this invention also increase the sourness and astringency of soluble coffee and have little effect on the bitterness or burntness of the coffee. The green flavor effect is unexpected since known pyrazine derivatives are generally characterized as nut-like having the taste of roasted hazlenuts, peanuts or almonds. Furthermore, the pyrazine derivatives of this invention lack the unpleasant, aggressive odor and metallic taste characteristic of some pyrazine compounds.

It is an object of this invention to provide a group of chemical compounds for the flavor alteration of foodstuffs.

It is a further object of this invention to describe processes for preparing and employing compounds useful for enhancing the flavor of foodstuffs.

A still further object of this invention is to provide a group of substituted pyrazines which will enhance the regular coffee flavor notes generally described by experts as green, earthy, and/or woody.

DESCRIPTION OF THE INVENTION

The substituted pyrazines, useful as coffee flavor enhancers in foodstuffs, are represented by the formula

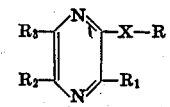

wherein;

x represents oxygen or sulfur;

R represents lower alkyl of one to six carbon atoms;

$R_1$, $R_2$ and $R_3$ each represent hydrogen or alkyl of one to 12 carbon atoms, provided that at least one of $R_1$, $R_2$ and $R_3$ is an alkyl radical of two to 12 carbon atoms.

Representative of the pyrazine compounds of this invention are 2-ethyl-3-methoxyprazine, 2-ethyl-5-methoxypyra-zine, 2-ethyl-6-methoxypyrazine, 2-iso propyl-3-methoxypyrazine, 2-n-propyl-5-methoxypyrazine, 2-iso pentyl-3-methoxypryazine, 2-n-pentyl-6-methoxypyrazine, 2-n-butyl-3-methoxypyrazine, 2-iso butyl-5-methoxypyrazine, 2-n-heptyl-5-methoxypyrazine, 2-(2-methyloctyl)-3-methoxypyrazine, 2-(1-methopropyl)-5-methoxypyrazine, 2-n-hexyl-3-methoxypyrazine, 2,5-diisobutyl-3-methoxypyrazine, 2-ethyl-5-iso propyl-3-methoxypyrazine, 2,3-diethyl-5-methoxypyrazine, 2-(1-methylbutyl)-3-methoxypyrazine, 2-(1-methylbutyl)-5-methoxypyrazine, 2-n-decyl-3-methoxypyrazine, 2-dodecyl-5-methoxypyrazine, 2-n-propyl-6-methylmercaptopyrazine, 2-isobutyl-5-methylmercaptopyrazine, 2-ethyl-3-methylmercaptopyrazine, 2-isobutyl-3-methylmercapto-pyrazine, 2-isopentyl-3-methylmercaptopyrazine, 2-isopropyl-3- methylmercaptopyrazine, 2-n-nonyl-3-methylmercaptopyrazine, 2,5-diisobutyl-3-methylmercaptopyrazine, 2,6-di-n-propyl-5-methylmercaptopyrazine, 2-dodecyl-5-methylmercaptopyrazine, 2,5,6-triethyl-3-methoxypyrazine, 2-ethyl-3-ethoxypyrazine, 2-isobutyl-3-n-propoxypyrazine, 2,5-diisobutyl-3-ethoxypyrazine, 2-methyl-5-ethyl-3-ethoxypyrazine, 2,5-di ethyl-5-ethoxypyrazine, 2,6-di-n-propyl-3-ethoxypyrazine, 2-iso propyl-5-n-propylmercaptopyrazine, 2-n-octyl-3-iso propylmercaptopyrazine, 2,5-diethyl-3-ethylmercaptopyrazine, 2-ethyl-3-methyl-5-ethylmercaptopyrazine, 2,6-diethyl-3-n-propylmercaptopyrazine, and the like.

A unique group of the pyrazines of this invention are those compounds where $R_1$ is hydrogen.

The pyrazine derivatives of formula I in which X is oxygen, are obtained by treating an alkyl substituted alkyoxy-pyrazine of formula

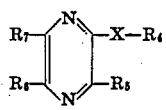

II wherein; $R_4$ represents a lower alkyl, preferably one to three carbon atoms; $R_5$, $R_6$ and $R_7$ represent hydrogen or an alkyl radical of one to 11 carbon atoms provided at least one of $R_5$, $R_6$ and $R_7$ is alkyl, with an alkylhalide having one to eleven carbon atoms in a reaction mixture of an alkali amide in liquid ammonia.

In a similar manner, pyrazine derivatives of formula I, in which X is sulfur, are prepared by treating an alkylmercapto-pyrazine (where X of formula II is sulfur) with a suitable alkylhalide having one to eleven carbon atoms.

The pyrazine derivatives of formula II in which X is oxygen are obtained by known methods, by treating halogenated alkylpyrazines of the formula

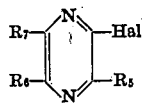

III where Hal represents a halogen such as chlorine bromine or the like; and the symbols $R_5$, $R_6$ and $R_7$ represent a hydrogen or alkyl radical of one to 11 carbons, provided at least one of $R_5$, $R_6$ and $R_7$ is alkyl, with an alkali metal alkoxide such as sodium methoxide, potassium propoxide or the like, or with powdered potassium hydroxide in an alcohol.

In an analogous manner, the pyrazine derivatives of formula II in which X is sulfur are prepared by treating a halogenated alkylpyrazine of formula III with an alkali metal alkylmercaptide, such as socium methylmercaptide, potassium ethylmercaptide, or by distilling an alkylmercaptan into an alkali alkoxide solution.

The halogenated alkylpyrazine, used as starting materials, can be prepared by known methods, for example by treating an alkylpyrazine with hydrogen peroxide and by reacting the resulting mixture of N-oxides with a phosphorous oxyhalide such as phosphorous oxychloride to produce a mixture of 3-chloro-, 5-chloro-, and 6-chloro-2-alkylpyrazine as taught by Max Winter, U.S. Pat. No. 3,328,402. These compounds may be separated by means of gas chromatography to obtain the individual isomers. The individual isomers or the unseparated isomer mixture may be then reacted with an alkali metal alkoxide or alkali metal alkylmercaptide to give alkyl-alkoxypyrazines or alkyl-alkylmercaptopyrazines, respectively.

Preferably the halogenated alkylpyrazines may be prepared by a modification of a method described by A. Hirschberg and P.E. Sperry, J. Org. Chem. 26, 2356 (1961). Alkylpyrazine is reacted with free halogen in a suitable solvent such as carbon tetrachloride. Excess halogen is added at intervals during the reaction to maintain saturation. The reaction mixture is allowed to stand overnight an the halogenated alkylpyrazine removed as a precipitated hydrochloride. The precipitate is washed with carbon tetrachloride and dried. The precipitate is treated with water and the crude 2-alkyl-halopyrazine isomer mixture is recovered in ether. The ether extract is dried over anhydrous sodium sulfate, filtered, concentrated and vacuum distilled to yield a purified mixture of 2-alkyl-halopyrazine isomers, predominately 2-alkyl-3-halopyrazine. The isomer mixture of 2-alkyl-3-halo- and 2-alkyl-5-halopyrazine is separated by gas chromatography if desired. The separated isomers or the isomer mixture is then treated with an alkali metal alkoxide or an alkali metal alkylmercaptide to yield alkyl-alkoxy- and alkyl-alkylmercaptopyrazines, respectively.

Alternatively, the pyrazines of formula I may be syntehsized by the condensation of amide of an amino acid with a 2-oxo-alkan-1-al, followed by alkylation of the resultant hydroxyalkyl pyrazine with diazoalkane, dialkylsulfate or the like. For example, the amide of the amino acid leucine may be reacted with glyoxal and the resulting 2-hydroxy-3-isobutylpyrazine methylated with diazomethane.

The pyrazine derivatives of formula I are useful for enhancing the flavor of food. They enhance coffee flavored foodstuffs where a regular coffee note characterized by coffee experts as green, earthy and low level woody is desired such as regular coffee, soluble coffee, coffee flavored icing, coffee flavored carbonated and non-carbonated soft drinks, coffee flavored beverages produced from non-coffee raw materials such as Postum Brand beverage, coffee flavored desserts such as gelatin, ice cream, pudding, cakes, cookies and the like, coffee flavored candies and the like and other foodstuffs which have in part a coffee flavor such as mocha flavored foodstuffs. The compounds of formula I are also useful for masking the caramel flavor sometimes associated with coffee flavored foodstuffs. The compounds of formula I mask the undesirable resinous, grainy and paper character of soluble coffee. They increase the sourness and astringency and have little effect on the bitterness or burntness of the coffee.

Depending on the flavor desired, the pyrazine of formula I can be incorporated in the foodstuffs either individually, in combinations of one or more or combined with other flavor ingredients and/or carriers.

Alkyl substituted alkoxy and alkylmercaptopyrazines where the alkyl substituent or substitutents consist only of methyl radicals are not part of this invention since these compounds lack the desired green flavor note.

Minute amounts of the pyrazine of formula I are sufficient to produce the desired green coffee note. For example, the new pyrazine derivatives have a threshold flavor level in coffee of less than one part per billion. In regular and soluble coffee at a 1.35 percent solids level, there is employed 0.01 part per billion to 10 parts per million of the pyrazines of this invention, preferably from 0.1 to 50 micrograms per liter. In general, the lower end of the concentration range of the pyrazine flavoring compound is sufficient to produce the desired green coffee note; say from 0.01 ppb to 1.0 ppm.

We have found that the degree of flavor impact varies according to the type of ring substituent. We have found that while alkoxy radicals from one to six carbons are useful, that one to three carbon alkoxy radicals are preferred with the methoxy radical producing a greater flavor impact than the higher carbon radicals such as ethoxy and the like. We have further found that sulfur analogs, while having the green and earthy taste, generally have reduced intensity from their corresponding oxygen analogs. We have further found that while the alkyl substituted alkoxy or alkymercaptopyrazines have the desired green coffee notes, that the higher carbon alkyl substituted derivatives, such as the 2-methyloctyl-3-methoxypyrazine have lower impact and may be more earthy in character. We have also discovered that di-alkyl substitution also produces a reduction in flavor impact over mono-substitute analogs. For best flavor impact we prefer alkyl radicals from three to five carbons. These changes in the strength of the pyrazine derivatives, depending on their substituent radicals, may be compensated for by adjusting the concentration of the pyrazine employed in the foodstuff. Initial panel screening by those of ordinary skill in the art is used to determine threshold and paper strength level for the particular foodstuff in which the flavor is to be employed.

The pyrazine derivatives, because of their high flavor impact, are conveniently diluted in solutions of edible solvents or diluents. The strength of the solution is not critical and would depend on the particular flavor application of the flavoring agent. Suitable solvents include ethyl alcohol, propylene glycol, oils such as cottonseed, coffee, peanut oil or the like or solid carriers such as sugars and the like. The flavoring agent may contain one or more pyrazine derivatives of formula I and may also include other flavoring agents incorporated to enhance particular notes that are desired in the foodstuff being flavored. Although not critical, normally the concentration of flavor in the carrier is 10 percent or less.

In addition to the application of the pyrazine derivatives of formula I in foodstuffs, these flavoring agents may also be employed in edible substances, such as pharmaceuticals, where a green coffee note is desired.

The invention is now illustrated but not limited by the following examples.

EXAMPLE I

An alkylation reaction medium is prepared containing 0.4 moles sodium amide in liquid ammonia by adding in situ 0.4 moles of sodium and $Fe(NO_3)_3$ catalyst to 600 ml. ammonia. To the alkylation medium there is added, drop-wise, over a one-half hour period, 0.4 moles of 2-methyl-3-methoxypyrazine. After the addition is completed, the mixture is stirred for an additional one-half hour and 2-bromopropane (0.25 moles) in 30 ml. ether is added drop-wise over a one-half hour period. Stirring is continued for one-half hour and the reaction mixture is quenched by the addition of 0.4 moles ammonium chloride. The ammonia is replaced by ether and the solids filtered. The ether solution is dried over anhydrous sodium sulfate, filtered and concentrated. On vacuum distillation, there is obtained 2-isobutyl-3-methoxypyrazine.

When 2-methyl-3-methoxypyrazine is treated as in the above example with methyliodide, 1-bromopropane, 2-bromobutane, ethyliodide and 2-bromooctane, there is produced 2-ethyl-3-methoxypyrazine, 2-n-butyl-3-methoxypyrazine, 2-(2-methylbutyl)-3-methoxypyrazine, 2-n-propyl-3-methoxypyrazine and 2-(2methyl-octyl)-3-methoxypyrazine, respectively.

When 2-ethyl-3-methoxypyrazine, 2,5-dimethyl-3-methoxypyrazine and 2-methyl-5-n-propyl-3-methoxypyrazine are reacted with ethyl iodide in a manner similar to the above example, there is produced: 2-(1-methylpropyl)-3-methoxypyrazine; a mxiture of 2-methyl-5-n-propyl-, 2-n-propyl-5-methyl- and 2,5-dipropyl-3-methoxypyrazine; and a mixture of 2,5-di-n-propyl-, 2-methyl-5-(1-ethylpropyl)-, and 2-n-propyl-5-(1-ethylpropyl)-3-methyoxypyrazine. The mixtures may be further separated into individual compounds by distillation and gas chromogrophy.

When 2-methyl-3-methoxypyrazine is replaced by 2-methyl-3-ethoxypyrazine, 2-ethyl-3-n-propoxypyrazine and 2-methyl-3-n-pentoxypyrazine and reacted with 2-bromopropane as in the above example there is produced 2-isobutyl-3-ethoxy-pyrazine, 2-(1,2-dimethylpropyl)-3-n-propoxypyrazine, and 2-isobutyl-3-n-pentoxypyrazine, respectively.

When an isomer mixture of 2-methyl-3-methoxy- and 2-methyl-5-methoxypyrazine is alkylated with 2-bromopropane as above, there is produced an isomer mixture of 2-isobutyl-3-methoxy-pyrazine and 2-isobutyl-5-methoxypyrazine.

EXAMPLE II

The 2-methyl-3-methoxypyrazine starting material for example I is prepared by adding 275 grams of an isomer mixture of 92 percent 2-methyl-3-chloropyrazine and 8 percent of 2-methyl-5-chloropyrazine to a sodium methoxide solution prepared from 53 grams of sodium and three liters of methanol. The reaction mixture is refluxed for two hours and methanol is distilled until bumping becomes troublesome. Sodium chloride is filtered and the filtrate washed with water, dried and concentrated. On vacuum distillation there is obtained 173 grams of an isomer mixture, b.p. 85°–6° C./50 mm., of 2-methyl-3-methoxypyrazine and 2-methyl-5-methoxypyrazine, for a 65 percent yield. The recovered distillate contains approximately a 12/1 ratio of the three to five isomer.

The isomer mixture is separated on a ¼ inch × 8 foot s.s. gas chromatography column packed with 10 percent OV–17 on Chromosorb "W" HP 80/100. The separation is made isothermally at 140° C. employing a 40–50 ml./min. helium flow rate. The separated isomers are trapped in cooled capillary tubes to give 2-methyl-5-methoxypyrazine and 2-methyl-3-methoxypyrazine.

When 2-methyl-3-chloro and 2-methyl-5-chloropyrazine is reacted with potassium n-propoxide in propanol instead of the sodium methoxide in methanol, as in the above example, there is produced an isomer mixture of 2-methyl-3-n-propoxy and 2-methyl-5-n-propoxypyrazine.

EXAMPLE III

An isomer mixture of 2-methyl-3-chloro- and 2-methyl-5-chloropyrazine is prepared by direct halogenation with chlorine in carbon tetrachloride.

Five liters of carbon tetrachloride is saturated with chlorine at 40° C. Methylpyrazine (750 g., 8 mole) is added drop-wise and an exothermic reaction ensues. The reaction flask is both heated or cooled as desired throughout the addition to promote a smooth reaction. Additional chlorine is added at intervals to maintain saturation. After the addition of the methylpyrazine is complete, the reaction mixture is allowed to stand overnight. The precipitated hydrochloride is filtered, washed with carbon tetrachloride and air dried. The solid is added to two liters of water and stirred well. The heavy oil which forms is separated by extraction with ether. The ether extracts are dried over anhydrous $Na_2SO_4$, filtered, concentrated and distilled under vacuum. An isomer mixture of 2-methyl-5-chloro and 2-methyl-3-chloropyrazine, b.p. 85°–6° C./50 mm. is formed in 48 percent yield (500 g.).

The isomers are separated, if desired, by gas chromatography.

EXAMPLE IV

An alternative means of preparing the halogenated alkylpyrazines is by treating methylpyrazine with hydrogen peroxide and then reacting the resulting mixture of N-oxides with phosphorus oxychloride. A mixture of the three mono-chlorinated methylpyrazine isomers is obtained. These can be separated by gas chromatagrphy into the individual 2-methyl-3-chloropyrazine, 2-methyl-5-chloropyrazine and 2-methyl-6-chloropyrazine.

EXAMPLE V

An isomer mixture of 2-methyl-3-methoxy- and 2-methyl-5-methoxypyrazine (12:1 isomer ratio - 49.6 g., 0.4 moles) is added drop-wise over one-half hour to a liquid $NH_3$ solution containing $NaNH_2$ (0.4 mole) which is prepared in situ from sodium 9.2 g., 0.4 mole, $Fe(NO_3)_3$ catalyst and liquid $NH_3$ (600 ml.). After the addition is complete, the mixture is stirred for an additional one-half hour and 2-bromopropane (30.5 g., 0.25 mole) in 30 ml. ether is added drop-wise over one-half hour. Stirring is continued for one-half hour and the reaction is quenched by the addition of $NH_4Cl$ (21.2 g., 0.4 mole). The $NH_3$ is replaced by ether and the solids filtered. The ether solution is dried over anhyd. $Na_2SO_4$, filtered and concentrated. Distillation under vacuum give 14.7 g. (35 percent yield) of an isomer mixture of 2-isobutyl-3-methoxy- and of 2-isobutyl- 5-methoxy-pyrazine.

The recovered isomer mixture is separated by preparative scale gas liquid partition chromatograph on a ¼ inch by 8 foot stainless steel column having 10% by weight OV-17 on a Chromosorb "W" HP 80/100 mesh support. The separation is conducted isothermally at 160° C. using a 40–50 ml./min. helium flow rate. The separated isomers are trapped in a capillary tube cooled in ice water.

EXAMPLE VI

A sodium ethoxide solution is prepared by dissolving 0.5 moles sodium in 600 ml. of ethanol. Methylmercaptan, 0.55 moles, is condensed in a cold trap and allowed to distill into the sodium ethoxide solution. To this solution is added 0.5 moles of an isomer mixture of 2-methyl-3-chloro- and 2-methyl-5-chloropyrazine prepared as in example III, and the solution is refluxed for two hours. The ethanol is distilled until bumping becomes troublesome. Sodium chloride residue is removed by filtration and the filtrate is washed with water, dried with anhydrous sodium sulfate and filtered. The solution is concentrated and a residue distilled in vacuum to give 60 grams of an isomer mixture of 2-methyl-3-methylmercapto and 2-methyl-5-methylmercaptopyrazine, boiling point 84°–7° C./10 mm. for an 80 percent yield. The isomer mixture is then alkylated by adding 0.25 moles of 2-bromopropane in an equal volume of ether drop-wise over one-half hour to a liquid ammonia solution containing 0.4 moles sodium amide. The sodium amide is prepared in situ from 0.4 moles sodium, $Fe(NO_3)_3$ catalyst and 600 ml. of ammonia. Stirring is continued for 15 minutes and the reaction is quenched by the addition of ammonium chloride, 0.4 moles. The ammonia is replaced by ether and the solids filtered. The ether solution is dried over anhydrous sodium sulfate, filtered and concentrated. On vacuum distillation there is obtained an isomer mixture of 2-isobutyl-3-methylmercapto-and 2-isobutyl-5-methylmercaptopyrazine, boiling point 115°–6° C/10 mm. for a 15 percent yield.

High resolution mass spectrometry gives a molecular weight of 182.0891, theory 182.0878.

The isomer mixture is separated as in example V on a ¼ inch × 8 foot s.s. chromatographic column at 180° C. to give the individual 2-isobutyl-3-methylmercaptopyrazine and 2-isobutyl-5-methylmercaptopyrazine.

When the 2-methyl-3-methylmercapto- and 2-methyl-5-methylmercaptopyrazine, intermediates above, are separated as in example II by gas chromatography at 150° C. and alkylated there is obtained the corresponding individual isobutyl-methyl-mercaptopyrazines.

When ethyl- and n-propyl-mercaptan are employed for the methylmercaptan of example VI, there is produced 2-methyl-ethylmercaptopyrazine and 2-methyl-n-propylmercaptopyrazine isomer mixture intermediates, which when reacted with methyl iodide in a manner equivalent to the reaction of 2-bromopropane in example VI give 2-ethyl-ethylmercaptopyrazine and 2-ethyl-n-propylmercaptopyrazine isomer mixtures, respectively.

When 2-bromopropane above is replaced by ethyl iodide or 1-bromo octane there is obtained 2-n-propyl-methylmercapto-pyrazine and 2-n-nonyl-methylmercaptopyrazine mixed isomers, respectively.

EXAMPLE VII 2-methyl-5-methoxypyrazine (0.5 moles) prepared as in example II, is added drop-wise, over a 30 minute period, to a liquid ammonia solution containing 0.5 moles sodium amide which is prepared in situ from 0.5 moles sodium, $Fe(NO_3)_3$ catalyst and 750 ml. of ammonia. After addition, the mixture is stirred for one-half hour and 2-bromopropane, 0.3 moles in 40 ml. ether, is added drop-wise over a 30 minute period. Stirring is continued for 30 minutes and the reaction mixture quenched by the addition of 0.5 moles ammonium chloride. The ammonia is replaced by ether and the solids filtered. The ether solution is dried over anhydrous sodium sulfate, filtered and concentrated. On vacuum distillation there is obtained 2-isobutyl-5-methoxypyrazine.

When methyl iodide, 1-bromopentane and ethyl bromide are used in place of 2-bromopropane there is obtained 2-ethyl-5-methoxypyrazine, 2-n-hexyl-5-methoxypyrazine and 2-n-propyl-5-methoxypyrazine.

When 2-methyl-5-ethoxypyrazine and 2-methyl-5-n-propoxypyrazine are reacted in a manner equivalent to the 2-methyl-5-methoxypyrazine of example V there is obtained 2-isobutyl-5-ethoxypyrazine and 2-isobutyl-5-n-propoxypyrazine.

EXAMPLE VIII a. 2,5-Dimethyl-3-Methoxy Pyrazine 2,5-dimethyl-3-chloropyrazine (Aldrich Chemical Co.) (17.2 g., 0.12 mole) in 50 ml. of methanol is added to a sodium methoxide solution prepared from 3 g. of sodium and 150 ml. of methanol. The reaction mixture is refluxed for two hours and allowed to cool. The NaCl is filtered and the filtrate diluted with $H_2O$ and extracted 3X with 100 ml. of ether. The ether extract is dried, filtered and concentrated, 2,5-dimethyl-3-methoxypyrazine is obtained, 54 percent yield, b.p. 76°–78° C./15 mm.

b. 2,5-dimethyl-3-methoxypyrazine (8 g., 0.05 mole) is added drop-wise over one-half hour to liq. $NH_3$ solution containing $NaNH_2$ (0.058 mole) which is prepared in situ from sodium (3 g., 0.058 mole), $Fe(NO_3)_3$ catalyst, and liquid $NH_3$. After the addition is complete, the mixture is stirred for an additional one-half hour and 2-bromopropane (5 g., 0.04 mole) in 5 ml. ether is added drop-wise over one-half hour. Stirring is continued for one-half hour, and the reaction is quenched by the addition of $NH_4Cl$ (5.5 g. 0.1 mole). The $NH_3$ is replaced by ether and the solids filtered. The ether solution is dried over anhyd. $Na_2SO_4$ filtered and concentrated. The residue is distilled under vacuum and a fraction is collected at 90°–100° C./3 mm. The distilled fraction is separated by preparative scale gas liquid partition chromatography on OV–17, 10 percent, ¼inch × 8 foot on Chromosorb "W" HP 80/100 mesh, 180° C. isothermal, into two fractions.

Fraction 1. A mixture of 2-isobutyl-3-methoxy-5-methylpyrazine and 2-methyl-3-methoxy-5-isobutylpyrazine. Molecular weight determined by high resolution mass Spectrometry 180.1251, theory 180.1263.

Fraction 2. 2,5-diisobutyl-3-methoxypyrazine. Molecular weight determined by high resolution mass Spectrometry 222.1739, theory 222.1732.

EXAMPLE IX

The following table gives the yield, physical properties and molecular weight of several compounds which are prepared by the following general procedure. 2-methyl-methoxypyrazine (mixed isomers) is added dropwise over one-half hour to liquid $NH_3$ solution containing $NaNH_2$ which is prepared in situ from sodium, $Fe(NO_3)_3$ catalyst, and liquid $NH_3$. After the addition is complete, the mixture is stirred for an additional one-half hour and an alkyl halide of the formula RX, in an equal volume of ether, is added drop-wise over a one-half hour. Stirring is continued for one-half hour and the reaction is quenched by the addition of $NH_4Cl$. The $NH_3$ is replaced by ether and the solids filtered. The ether solution is dried over anhyd. $Na_2SO_4$, filtered and concentrated. The residue is distilled under vacuum to give 2—$CH_2R$—methoxypyrazine mixed isomers.

Nuclear magnetic resonance spectra (Varian A–60) were obtained for all compounds synthesized and are consistent with the proposed structures.

EXPERIMENT RESULTS OF EXAMPLE IX

| Starting halide R' | Product $CH_2R'$ | Yield, percent | B.P. | Mm. | Mass *Measured | Mass Theoretical | Empirical formula |
|---|---|---|---|---|---|---|---|
| $CH_3$ | Ethyl | 76 | 72–5 | 15 | 138.0793 | 138.0793 | $C_7H_{10}N_2O$ |
| $C_2H_5$ | n-Propyl | 65 | 90–3 | 20 | 152.0952 | 152.0950 | $C_8H_{12}N_2O$ |
| n-$C_3H_7$ | n-Butyl | 40 | 106–8 | 20 | 166.1101 | 166.1106 | $C_9H_{14}N_2O$ |
| i-$C_3H_7$ | Isobutyl | 36 | 83–4 | 10 | 166.1105 | 166.1106 | $C_9H_{14}N_2O$ |
| i-$C_4H_9$ | Isopentyl | 64 | 118–20 | 20 | 180.1269 | 180.1263 | $C_{10}H_{16}N_2O$ |
| n-$C_5H_{11}$ | n-Hexyl | 59 | 93–5 | 2 | 194.1427 | 194.1419 | $C_{11}H_{18}N_2O$ |
| 2-octyl | 2-methyl octyl | 25 | 109–10 | 1 | 236.1892 | 236.1889 | $C_{14}H_{24}N_2O$ |

*Molecular weights and mass spectra are determined on Consolidate Electrodynamics Corp. high resolution mass spectrometer model 21–110.

EXAMPLE X

Informal panel evaluations were made of the compounds listed in the following table. The compounds were added to water and to instant coffee.

Standard solutions of each of the compounds are pre-

PANEL RESULTS OF EXAMPLE X

| | Water | | | I.M.H. | |
|---|---|---|---|---|---|
| | Conc., p.p.m. | Arbitrary intensity | Description | Conc., p.p.m. | Description |
| 2-ethyl-3-methoxypyrazine* | 0.1 | High | Earthy, green | 0.1 | Green, green pepper, string bean. |
| 2-n-propyl-3-methoxypyrazine* | 0.1 | do | Green, green pepper | 0.2 | Green, green pepper, earthy. |
| 3-(1-methylpropyl)-3-methoxypyrazine* | 0.1 | do | Green | 0.1 | Green, string bean. |
| 2-isobutyl-3-methoxypyrazine | 0.1 | do | Green, green pepper | 0.05 | Green pepper, earthy. |
| 5-isobutyl-2-methoxypyrazine | 0.1 | do | Green pepper, green | 0.2 | Green, earthy, string bean. |
| 2-n-butyl-3-methoxypyrazine* | 0.1 | Mod | Green | 0.2 | Green. |
| 2-isopentyl-3-methoxypyrazine* | 0.1 | High | Green pepper | 0.2 | Green, earthy, woody. |
| 2-(1-methylbutyl)-3-methoxypyrazine* | 0.1 | do | Green pepper, green | 0.2 | Green, earthy, string bean. |
| 2-n-hexyl-3-methoxypyrazine* | 0.1 | Mod | Green | 0.2 | Green, celery. |
| 2-(2-methyloctyl)-3-methoxypyrazine* | 0.1 | Mod | Earthy, slightly green | 0.2 | Earthy. |
| 2-methy-3-methoxy-2-isobutylpyrazine 2-isobutyl-3-methoxy-2-methylpyrazine | 0.1 | Mod | Earthy, green | 0.2 | Slightly green. |
| 2,5-di isobutyl-3-methoxypyrazine | 0.1 | Low | Potato skin, very slightly green | 0.2 | Do. |
| 2-isobutyl-3-ethoxypyrazine* | 0.1 | Mod | Green, slightly earthy | 0.1 | Slightly green, earthy. |
| 2-isobutyl-3-methylmercaptopyrazine | 0.1 | Mod | Green, green pepper | 0.1 | Do. |
| Isobutylpyrazine | 0.1 | Low | | 0.15 | |
| 2-methyl-3-methoxypyrazine* | 0.1 | Mod | Nutty, cracker | 0.07 | Toasted cracker, slightly earthy. |
| 2-methyl-3-ethoxypyrazine* | 0.1 | Mod | Nutty, earthy | 0.08 | Nutty, caramel. |
| 2-methyl-3-methylmercaptopyrazine* | 0.1 | High | Nutty, cracker | 0.1 | Cracker, slightly toasted. |

*Isomer mixture containing 90% or more of the named compound.

pared by adding five milligrams of the pyrazine compound to 25 ml. of water. A few drops (10–20 drops) of ethanol are added to produce a standard solution.

For the water evaluation 50 microliters of the standard pyrazine solution is added to 100 ml. of room temperature, distilled water to give a concentration of 0.1 ppm. Each evaluation in water is the average response of at least six panel members.

For the soluble coffee evaluation the standard pyrazine solution is added on the basis of a preliminary flavor impact analysis to the hot coffee containing 1.35 percent coffee solids. In many cases 0.2 ppm concentration is arbitrarily employed.

The general flavor response illustrates the green and earthy character imparted by the compounds of this invention (formula I) to the test solution. The green flavor was judged to be a highly desirable coffee note not heretofore synetheticaly produced.

When the standard pyrazine solution is sprayed on regular ground coffee the brewed character of percolated coffee is enhanced by the green flavor note of the compounds of this invention.

EXAMPLE XI

The effect of an isomer mixture of 92 percent 2-methoxy-3-isobutylpyrazine and 8 percent of 2-methoxy-5-isobutylpyrazine was evaluated by an expert profile panel at one, two and four micrograms per liter of soluble coffee (1, 2 and 4 ppb). At these levels the enhanced samples were found to be significantly different from the control. The enhanced samples were found to have an increase in the desirable earthy, green-woody and green pepper notes as compared to the control. A smoother mouthfeel was noted for the 1 ppb sample. The pyrazines were also found to mask the undesirable resinous, grainy, and paper character of soluble coffee. These levels of pyrazine were found to increase the sourness and astringency of soluble coffee and to have no effect on the bitterness or burntness.

The expert panel felt that the concentration was at a high level and recommend a level of 0.5 micrograms per liter.

The optimum level of other pyrazines of this invention is easily determined in a similar manner.

What is claimed is:

1. A process for enhancing the earthy flavor in foodstuffs comprising adding thereto an amount of 2-ethyl-3-methoxypyrazine effective to enhance the earthy flavor of the foodstuff.

2. The method of claim 1 wherein the amount is from 0.01 part per billion to 10 parts per million based on the weight of the foodstuff.

3. A foodstuff having added thereto an amount of 2-ethyl-3-methoxypyrazine effective to enhance the earthy flavor of foodstuff.

4. The foodstuff of claim 3 in which the amount is from 0.01 part per billion to 10 parts per million based on the weight of the foodstuff.

5. A flavoring composition which includes 2-ethyl-3-methoxypyrazine as an active earthy flavoring ingredient incorporated with an edible solvent or diluent.

6. The composition of claim 5 wherein the active earthy flavoring concentration is 10 percent or less.

* * * * *

UNITED STATES PATENT OFFICE
CERTIFICATE OF CORRECTION

Patent No. 3,767,425          Dated October 23, 1973

Inventor(s) Thomas H. Parliment, et al.

It is certified that error appears in the above-identified patent and that said Letters Patent are hereby corrected as shown below:

Column 1, line 27, "cpomounds" should read -- compounds --. Column 3, line 55, after "as" and before "methyl-mercaptide" change "socium" to -- sodium --. Column 9, under Panel Results of Example X, "3-(1-methylpropyl)-3-methoxyprazine*" should read -- 2-(methylpropyl-3-methoxypyrazine* --.

Signed and sealed this 17th day of September 1974.

(SEAL)
Attest:

McCOY M. GIBSON JR.                C. MARSHALL DANN
Attesting Officer                  Commissioner of Patents